(12) United States Patent
Schaefer et al.

(10) Patent No.: US 11,966,602 B2
(45) Date of Patent: *Apr. 23, 2024

(54) REFRESH COUNTERS IN A MEMORY SYSTEM

(71) Applicant: Micron Technology, Inc., Boise, ID (US)

(72) Inventors: Scott E. Schaefer, Boise, ID (US); Aaron P. Boehm, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/100,825

(22) Filed: Jan. 24, 2023

(65) Prior Publication Data
US 2023/0161491 A1 May 25, 2023

Related U.S. Application Data

(63) Continuation of application No. 17/090,630, filed on Nov. 5, 2020, now Pat. No. 11,579,784.

(60) Provisional application No. 62/941,630, filed on Nov. 27, 2019.

(51) Int. Cl.
*G06F 3/06* (2006.01)
(52) U.S. Cl.
CPC .......... *G06F 3/0632* (2013.01); *G06F 3/0604* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| 7,979,760 | B2 | 7/2011 | Kim et al. |
| 11,579,784 | B2* | 2/2023 | Schaefer ............... G06F 3/0634 |
| 2004/0141580 | A1 | 7/2004 | Maletsky |
| 2005/0063315 | A1 | 3/2005 | Chen et al. |
| 2007/0022245 | A1 | 1/2007 | Sohn et al. |

(Continued)

FOREIGN PATENT DOCUMENTS

WO 2015/017156 A1 2/2015

OTHER PUBLICATIONS

Dutt et al., Fault Tolerance in Computer Systems—From Circuits to Algorithms, The Electrical Engineering Handbook 2005. (Year: 2005).

(Continued)

*Primary Examiner* — Prasith Thammavong
*Assistant Examiner* — Edmund H Kwong
(74) *Attorney, Agent, or Firm* — Holland & Hart LLP

(57) ABSTRACT

Methods, systems, and devices for refresh counters in a memory system are described. In some examples, a memory device may include two or more counters configured to increment a respective count based on refresh operations performed on a memory array. A comparison may be made between two or more of the respective counts, which may include determining a difference between the respective counts or a difference in rate of incrementing. A memory device may transmit an indication to a host device based on determining a difference between counters, and the memory device, the host device, or both, may perform various operations or enter various operational modes based on the determined difference.

20 Claims, 8 Drawing Sheets

(56) References Cited

U.S. PATENT DOCUMENTS

| | | |
|---|---|---|
| 2008/0065933 A1 | 3/2008 | Thayer |
| 2009/0228747 A1 | 9/2009 | Kim et al. |
| 2012/0151299 A1 | 6/2012 | Suh |
| 2015/0162064 A1 | 6/2015 | Oh et al. |
| 2016/0034211 A1 | 2/2016 | Minamimoto |
| 2016/0284386 A1 | 9/2016 | McCall et al. |
| 2017/0060429 A1 | 3/2017 | Gupta et al. |
| 2017/0060453 A1 | 3/2017 | Kodera et al. |
| 2018/0151227 A1 | 5/2018 | Fujiwara et al. |
| 2019/0147941 A1 | 5/2019 | Qin et al. |

OTHER PUBLICATIONS

International Search Report and Written Opinion received for PCT Patent Application No. PCT/US20/59876, dated Feb. 23, 2021, 7 pages.

\* cited by examiner

REFRESH COUNTERS IN A MEMORY SYSTEM

CROSS REFERENCE

The present Application for Patent is a continuation of U.S. patent application Ser. No. 17/090,630, by SCHAEFER et al., entitled "REFRESH COUNTERS IN A MEMORY SYSTEM," filed Nov. 5, 2020, which claims the benefit of U.S. Provisional Patent Application No. 62/941,630, by SCHAEFER et al., entitled "REFRESH COUNTERS IN A MEMORY SYSTEM," filed Nov. 27, 2019, each of which is assigned to the assignee hereof, and each of which is expressly incorporated by reference herein.

BACKGROUND

The following relates generally to one or more memory systems and more specifically to refresh counters in a memory system.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

Some memory devices, such as memory devices that include volatile memory cells, may perform refresh operations to periodically refresh logic states stored by the memory cells.

DETAILED DESCRIPTION

Figure 1:
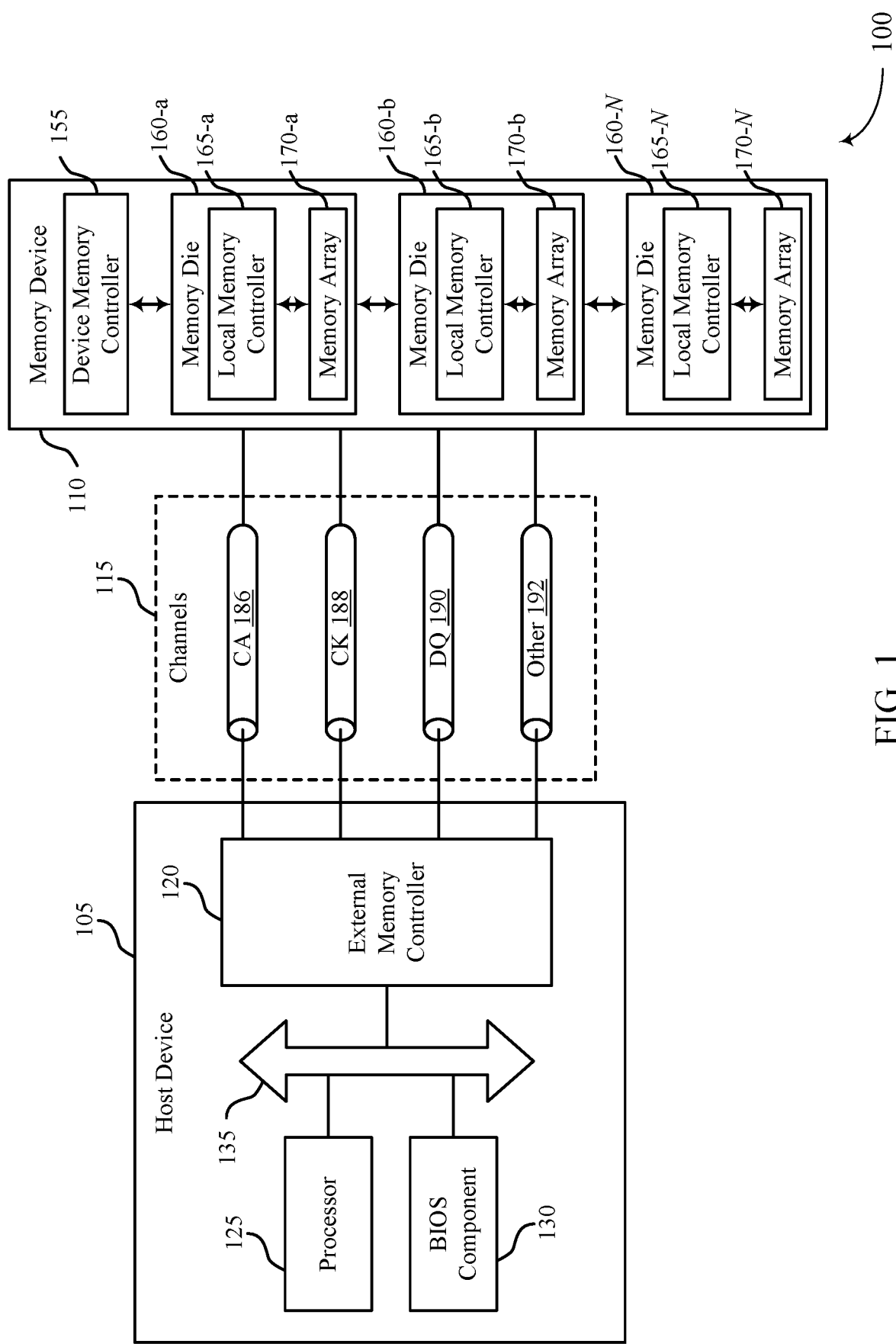
FIG. 1 illustrates an example of a system that supports refresh counters in a memory system in accordance with examples as disclosed herein.

A memory system in accordance with examples disclosed herein may include a memory device and a host device coupled with the memory device. Reliability of a memory device in such a system may be based on a statistical probability of failures at the memory device, which may be referred to as a failure in time (FIT), or other terminology. Some applications, such as vehicle safety systems, autonomous vehicle systems, or other safety-critical systems, may have particularly high reliability requirements, or may otherwise require a particularly low probability of failures.

In some memory systems, reliability may be improved when failures are identified, detected, or otherwise handled. For example, if a memory device experiences one hundred failures in a given duration (e.g., a FIT of 100), but all of the errors are handled without operational failure (e.g., where all the errors are handled by an error correction algorithm), the memory device may be associated with a zero FIT (e.g., a zero "Safety FIT") or other measure of relatively high reliability. In other words, a memory device that employs techniques for reducing uncertainties associated with failures, even if such failures occur, may have a favorable reliability compared to a memory device that does not employ such techniques to reduce uncertainty, or otherwise has relatively high uncertainty associated with failures.

In some memory devices, such as those that include memory cells having a degree of volatility, refresh operations may be performed by the memory device to periodically refresh logic states stored by respective memory cells. Some memory devices may include a counter, which may be referred to as a refresh counter, that increments a count based on performing refresh operations on a memory array. A count may be incremented by such a counter, for example, each time a row of a memory array is refreshed, or each time a page of a memory array is refreshed, or each time a section of a memory array is refreshed, among other examples. Such a counter may be used to evaluate whether refresh operations are being performed properly on a memory device, among other purposes. Although a single counter may be evaluated to identify whether operations are being performed successfully, a failure of the counter itself (e.g., a stuck bit, a count skip or slip, an improper address, or other errant counting operation) may result in errors or uncertainties associated with operations of a memory device or a memory system that includes a memory device. Thus, without otherwise verifying operation of a refresh counter, it may be necessary to assume a certain FIT loss or other reliability uncertainty for a refresh counter since its operation is uncertain when the memory device is in operation.

The techniques described herein may improve a reliability in or a reliability rating in a memory system by implementing multiple refresh counters at a memory device, and evaluating differences between counts of such refresh counters, to identify whether the memory device is experiencing an error or other operational abnormality. For example, a memory device may transmit an indication to a host device based on determining a difference between refresh counters, and the memory device, the host device, or both, may perform various operations or enter various operational modes based on the determined difference. Accordingly, the memory device, the host device, or both, may support reductions in operational uncertainties that may not be supported by another memory device, such as one having a single refresh counter, or a memory device that does not perform such a determination of differences between counters. For example, a real-time confirmation or evaluation supported by multiple refresh counters may remove certain uncertainties regarding refresh or other operations, which may improve a safety FIT, or other measure of reliability that considers such removal or mitigation of failure uncertainties, among other advantages.

Features of the disclosure are initially described in the context of memory systems and dies as described with reference to FIGS. 1 and 2. Features of the disclosure are described in the context of a counter comparison layout as described with reference to FIG. 3. These and other features of the disclosure are further illustrated by and described with reference to an apparatus diagram and flowcharts that relate to refresh counters in a memory system as described with references to FIGS. 4-8.

FIG. 1 illustrates an example of a system 100 that supports refresh counters in a memory system in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105, or a read command indicating that the memory device 110 is to provide data stored in a memory die 160 to the host device 105, or a refresh command indicating that the memory device 110 is to refresh logic states stored at the memory device 110.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the memory arrays 170 of the memory device 110 may include memory cells having a degree of volatility, and refresh operations may be performed by the memory device 110 to periodically refresh logic states stored by respective memory cells. In some examples, refresh operations may be performed at the memory device 110 based on a configured periodicity or other triggering event by a component of the memory device 110 (e.g., as determined at a device memory controller 155 or a local memory controller 165). An example of such a configuration may be referred to as a "self-refresh" mode, where the memory device 110 may enter a standby mode and perform refresh operations based on an internal oscillator (e.g., of a device memory controller, of a local memory controller 165).

Additionally or alternatively, refresh operations may be performed at the memory device 110 based on a periodicity or other triggering event by a host device 105 (e.g., as signaled or commanded over a channel 115). An example of such a configuration may be referred to as an "auto-refresh" mode, where refresh commands, such as a command to refresh all rows of a memory array 170, are initiated by the host device 105. A periodicity of such commands may be determined at the host device, and may be dependent on temperature, among other parameters.

In accordance with examples as disclosed herein, the memory device 110 may include two or more refresh counters that are configured for incrementing a count value based on the same refresh operations, and respective count values of such refresh counters may be compared or otherwise evaluated to determine whether the memory device 110 is operating normally. For example, each of a set of refresh counters may be configured to increment (e.g., simultaneously, in parallel) a count based on refreshing memory cells of a row of a memory array 170, or based on refreshing memory cells of a page of a memory array 170, or based on refreshing memory cells of a section of a memory array 170, and so on. In other words, multiple refresh counters, which may be referred to as redundant refresh counters or supplemental refresh counters, may be provided at a memory device 110 to provide normally or generally redundant count values (e.g., count values that would be identical or incrementing at a same rate under normal operations).

A difference in count values between redundant refresh counters of the memory device 110 may indicate an error or otherwise abnormal operation at the memory device 110, which may be used to support various operations or operational modes of the memory device 110 or the host device 105. Accordingly, the memory device 110, the host device 105, or both, may support reductions in operational uncertainties that may not be supported by a memory device having a single refresh counter, or a memory device that does not perform such a determination of differences between counters. In some examples, a set of two of more redundant or supplemental refresh counters may be provided at a device memory controller 155 of a memory device 110, or respective sets of two or more redundant or supplemental refresh counters may be provided at each of a set of local memory controllers 165 of a memory device 110, which may support various granularities of error identification or handling (e.g., error identification or handling for the memory device 110 as a whole, error identification or handling for a particular memory die 160 of the memory device 110).

Figure 2:
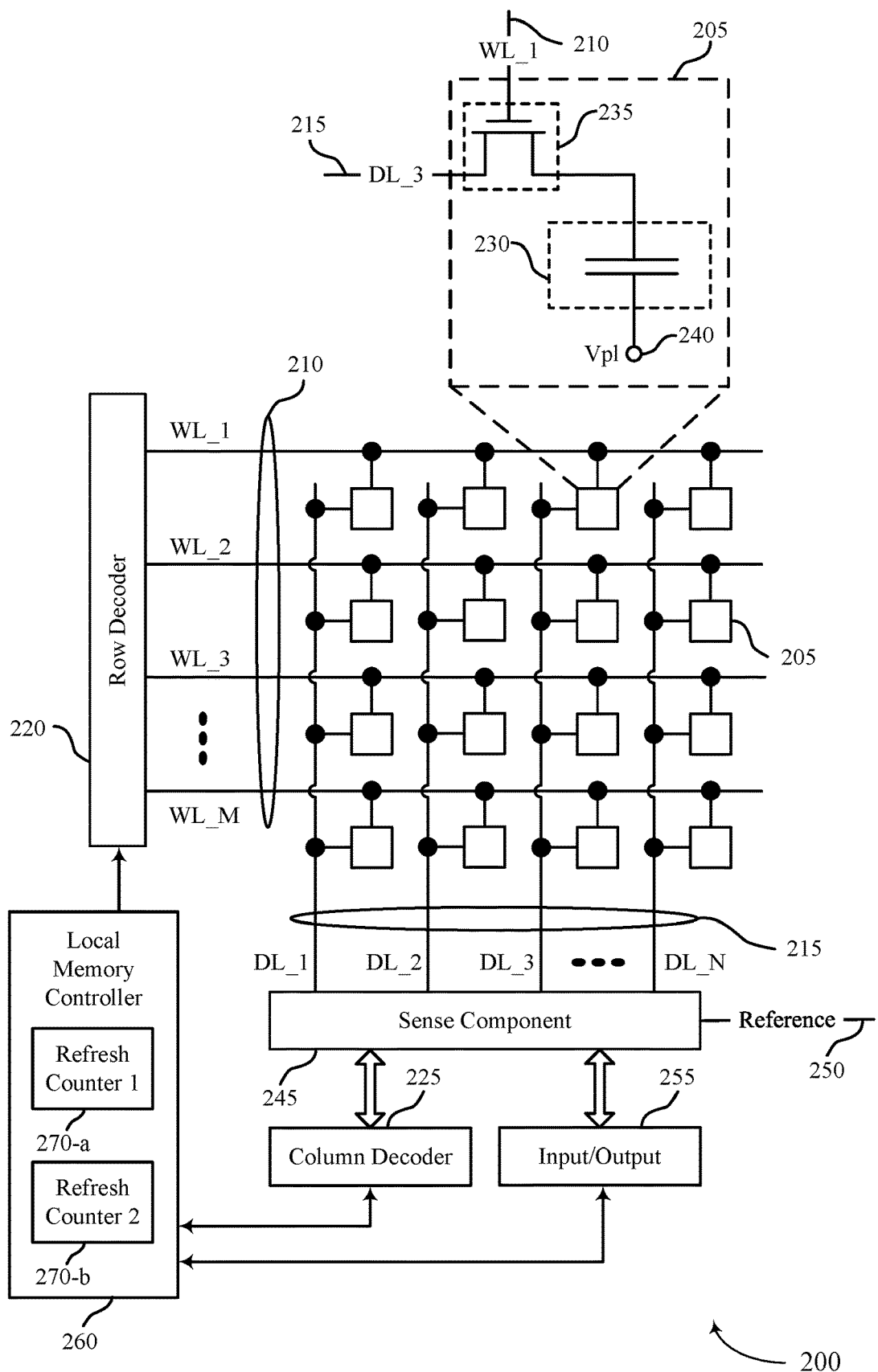
FIG. 2 illustrates an example of a memory die that supports refresh counters in a memory system in accordance with examples as disclosed herein.

FIG. 2 illustrates an example of a memory die 200 that supports refresh counters in a memory system in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., a programmed one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230 and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be operable to couple and/or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

The local memory controller 260 may be operable to perform a refresh operation on one or more memory cells 205 of the memory die 200. During a refresh operation, the logic state stored in a memory cell 205 of the memory die 200 may first be determined (e.g., in accordance with aspects of a read operation described above), and then the memory cell 205 may be reprogrammed according to the determined logic state (e.g., in accordance with aspects of a write operation described above). Such a refresh operation may be performed to restore or elevate a state of charge associated with respective logic states, or restore or broaden read margins within an acceptable range, which may overcome aspects of volatility or other logic state degradation in the memory cells 205 of the memory die 200. In various examples, refresh operations may be initiated by a component of the memory die 200 (e.g., initiated by the local memory controller 260), or initiated by a host device in communication with the memory die 200 (e.g., performed in response to signaling from a host device as received at the local memory controller 260), or both.

In accordance with examples as disclosed herein, the memory die 200 (e.g., the local memory controller 260) may include a first refresh counter 270-a and a second refresh counter 270-b, which may each be configured to increment a respective count value based on refresh operations performed on the memory cells 205. The respective count values of the first refresh counter 270-a and the second refresh counter 270-b may be compared or otherwise evaluated to determine whether the memory die 200 is operating normally. For example, a difference between a count value of the first refresh counter 270-a and a count value of the second refresh counter 270-b, or a difference that satisfies a threshold, may indicate an error or otherwise abnormal operation at the memory die 200. For example, a difference in count values between the first refresh counter 270-a and the second refresh counter 270-b may indicate that one of the refresh counters 270 has failed or has otherwise operated abnormally (e.g., with a stuck bit, with a skipped or slipped incrementing).

In some examples, an indication of a difference in counts between refresh counters 270 may be used to support various operations or operational modes of the memory die 200, of a memory device 110 that includes the memory die 200, or host device 105 in communication with the memory die 200 (or any combination thereof), to reduce uncertainties that may be associated with various failures or problems (e.g., of the first refresh counter 270-a, of the second refresh counter 270-b, of another component of the memory die 200). Accordingly, including both the first refresh counter 270-a and the second refresh counter 270-b may support reductions in operational uncertainties that may not be supported by a memory die having a single refresh counter, or a memory die that does not perform an evaluation of differences between counters, which may improve a FIT or other reliability metric associated with the memory die 200.

Figure 3:
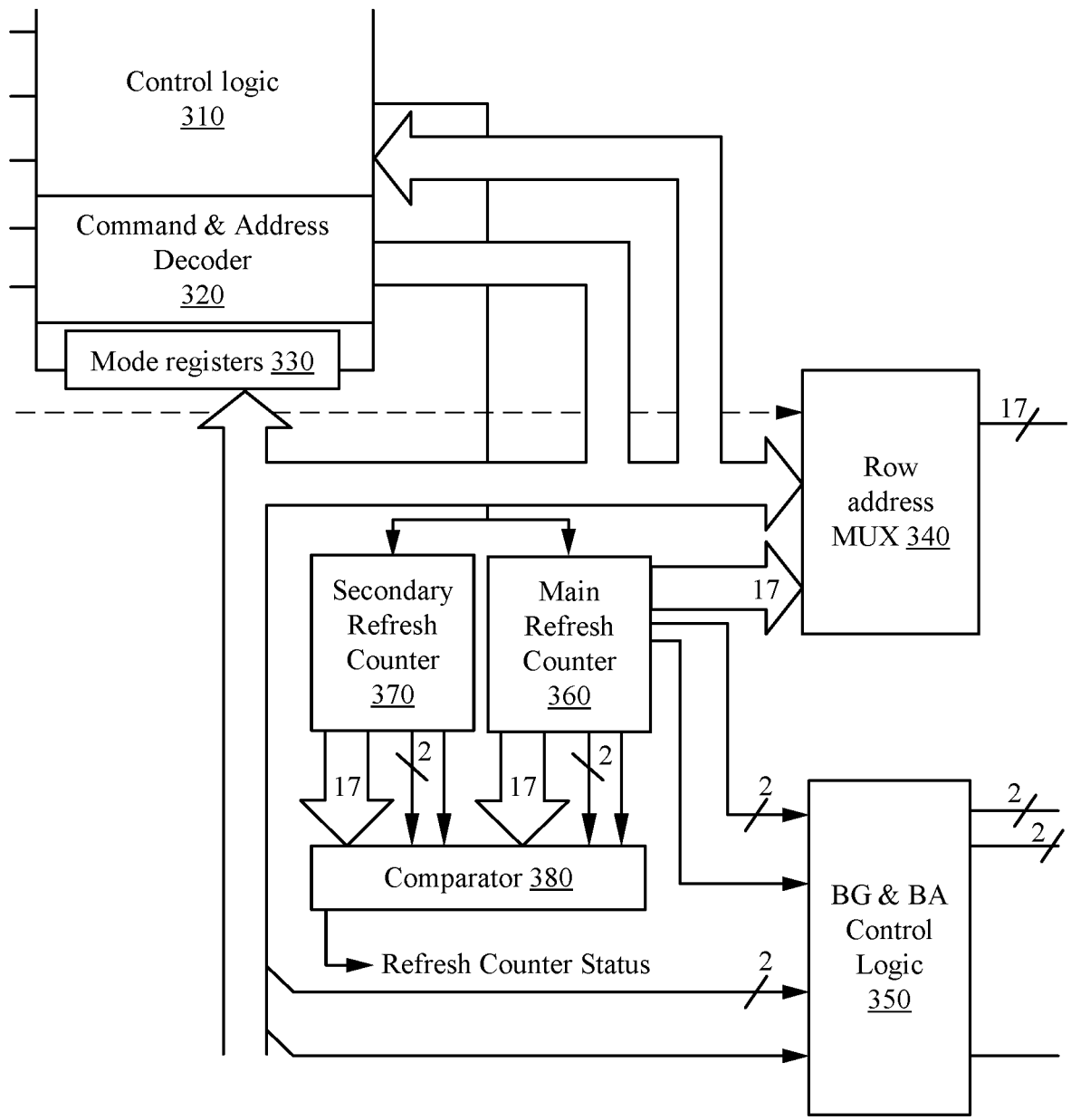
FIG. 3 illustrates an example of a counter comparison layout that supports refresh counters in a memory system in accordance with examples as disclosed herein.

FIG. 3 illustrates an example of a counter comparison layout 300 that supports refresh counters in a memory system in accordance with examples as disclosed herein. The counter comparison layout 300 may illustrate aspects of a memory device 110 or a memory die 200 as described with reference to FIGS. 1 and 2. In various examples, the counter comparison layout may illustrate components of a device memory controller or a local memory controller 165 as described with reference to FIG. 1, or a local memory controller 260 as described with reference to FIG. 2, or a combination thereof.

The counter comparison layout 300 may include one or more components that are configured or operable for signaling with a host device 105. For example, the counter comparison layout 300 may include control logic 310, a command and address decoder 320, and mode registers 330, which may be configured for information or other signaling exchange with a host device 105. The counter comparison layout 300 may also include various components that are configured to support operations on a memory die 160 or a memory array 170. For example, the counter comparison layout 300 may include a row address multiplexer (MUX) 340 and bank group (BG) and bank address (BA) control logic 350, which may be configured to support access operations on particular portions of a memory array 170.

The counter comparison layout 300 also may include a main refresh counter 360 that is configured to increment a count based on refresh operations performed on an associated memory array 170. The main refresh counter 360 may be configured to increment a count each time a row of the memory array 170 is refreshed, and a count may roll over to a zero value upon exceeding a numerical capacity or other limit of the main refresh counter 360. Additionally or alternatively, a count of the main refresh counter 360 may be reset to a default value (e.g., zero value) periodically, or upon completing refresh operations on all rows of the memory array 170. Additionally or alternatively, a count of the main refresh counter 360 may be reset upon completing a validation operation (e.g., following a detection of different count values and return to normal operations) or other issue resolution. In some examples, the main refresh counter 360 may be configured to output a count value or other status signaling to one or both of the row address MUX 340 or the BG and BA control logic 350.

The counter comparison layout 300 also may include a secondary refresh counter 370 (e.g., a redundant refresh counter, a confirmation refresh counter) that is also configured to increment a count based on refresh operations performed on the associated memory array 170. The secondary refresh counter 370 may be configured to increment a count in a same manner as the main refresh counter 360. Thus, under normal operating conditions (e.g., normal operation of the main refresh counter 360 and the secondary refresh counter 370), a count accumulated by the secondary refresh counter 370 may be identical to a count accumulated by the main refresh counter 360, or a rate of incrementing by the secondary refresh counter 370 may be identical to a rate of incrementing by the main refresh counter 360. When the count of the main refresh counter 360 and the count of the secondary refresh counter 370 are different, or are incrementing at different rates, one or both of the main refresh counter 360 or the secondary refresh counter 370 may be operating abnormally.

By including the secondary refresh counter 370, the counter comparison layout 300 may support various techniques for reducing operational uncertainties of a memory device 110, or a system that includes a memory device 110. For example, the memory device 110, or a host device 105 in communication with the memory device 110, may enter an operational mode (e.g., a safe state, an evaluation state) that supports identifying or confirming whether the memory device 110 is otherwise operating properly, such as identifying or confirming that refresh operations themselves are being performed normally, whether address decoding is being performed normally, whether abnormal operation of the main refresh counter 360 or the secondary refresh counter 370 was temporary, whether data exchange (e.g., read or write operations) with the memory device 110 is being supported, and others. In some examples, the memory device 110 may increase a rate of performing refresh operations (e.g., doubling a rate of refresh operations), which may be associated with a temporary state (e.g., during an evaluation of safe state), or may be associated with an increased rate of refresh that continues whenever the counts or rate of incrementing between the main refresh counter and the secondary refresh counter are different or otherwise satisfy a threshold.

Additionally or alternatively, signaling supported by including the secondary refresh counter 370 may support indicating an operational state of the memory device 110, or a modification of an operational state of the memory device 110 (e.g., to a safe state), to a host device 105, which may enable the host device 105 to enter an operational mode in which the host device confirms functional operations of the memory device 110, uses a different memory device 110 for access operations, indicates a possible error state (e.g., to a user, to the system that includes the host device 105 and the memory device 110), and other functions. In another example, if the memory device 110 indicates to the host device 105 that a counter mismatch condition exists, the host device 105 may increase a rate of commanding refresh operations.

Thus, including the secondary refresh counter 370 may support reducing uncertainties around operational states, which may include reducing uncertainties around conditions that may indicate or suggest possible error states of the memory device 110. Such a reduction of uncertainties may be beneficial in applications such as vehicle control systems, safety systems, autonomous vehicles, and others, where operational certainty is required to ensure ongoing operations of the system. For example, although operations of the memory device 110 may be able to continue normally in some cases where a count of the main refresh counter 360 and the secondary refresh counter are different, or have a difference that is greater than a threshold, such conditions may provide an early indication of abnormal conditions that may be evaluated by a memory system, which may support confirming operations and reducing uncertainties around the operational state of the system 100.

To support an evaluation of counts or incrementing between the main refresh counter 360 and the secondary refresh counter 370, the counter comparison layout 300 also includes a comparator 380 to compare counts as indicated by the main refresh counter 360 and the secondary refresh counter 370. The comparator 380 may be configured to support various signaling when counts of the main refresh counter 360 and the secondary refresh counter 370 are equal or different, or when rates of incrementing of the main refresh counter 360 and the secondary refresh counter 370 are equal or different. Although the comparator 380 is illustrated as comparing signaling received from two refresh counters, a comparator 380 may be configured to compare three or more refresh counters in a comparison set. Moreover, in some examples, a comparator 380 may be configured to select or calculate a particular count value to output (e.g., to the row address MUX 340, to the BG an& BA control logic 350), such as selecting an output from a favored refresh counter, or some average thereof. Thus, the comparator 380 may be configured in various manners, and may support various functionality based on count values received from the main refresh counter 360, or the secondary refresh counter 370, or both.

In one example, the comparator 380 may be configured in an XOR configuration with a binary output via a "Refresh Counter Status" pin or signal path. In such a configuration, the comparator 380 may output a logic 0 when the counts indicated by the main refresh counter 360 and the secondary refresh counter are equal, or a logic 1 when the counts indicated by the main refresh counter 360 and the secondary refresh counter 370 are different. In another example, the comparator 380 may be configured to signal a logic 0 if the counts or rate of incrementing of the main refresh counter 360 and the secondary refresh counter 370 satisfy a threshold (e.g., are within a threshold quantity of counts, are within a threshold rate of incrementing), or a logic 1 if the counts or rate of incrementing of the main refresh counter 360 and the secondary refresh counter 370 do not satisfy the threshold. However, other logical and signaling configurations are possible in accordance with examples described herein. In some examples, the comparator 380 may also include a toggle detector for one or more of the associated counters, which may support detection of a stuck counter.

In some examples, a result of the comparator 380 may be indicated to the mode registers 330, and the result of the comparator 380 may be stored in the mode registers 330. For example, any mis-match in count or rate of incrementing between the main refresh counter 360 and the secondary refresh counter 370 may be registered as an error in the mode registers 330 (e.g., in a MRx5[op4] field). The value of the mode registers 330 may be signaled to a host device 105 under various circumstances, including a signaling during a periodic or triggered status exchange (e.g., over a control channel or signal path, over a sideband channel or signal path). For example, signaling related to refresh counter comparisons may be included on a sideband signal that is separate from other signaling, such as an enhanced status signaling channel or signal path (e.g., a real-time status channel, a DSF channel, a DSF+ channel, an alert pin, a parallel pin). In some examples, a DSF channel may refer to a special-function enable input. In some examples, an error value of the mode registers 330 may be indicated in a data burst (e.g., over a data channel between the memory device 110 and the host device 105). In other examples of the counter comparison layout 300, an indication may be provided to a host device 105 without first storing a value in the mode registers 330.

In some examples, the host device 105 may poll or interrogate a memory device 110 that includes the counter comparison layout 300 for information from the mode registers 330, which may include or otherwise be referred to as the host device 105 reading the mode registers 330 of the memory device 110, or the memory device 110 transmitting signaling indicating a value or flag of the mode registers 330 to the host device 105. A rate of such polling or interrogating may be configured for various applications, such as configuring a relatively higher rate of polling for safety-critical systems, or a relatively lower rate of polling for systems where delay in status signaling to a host device 105 is more tolerable. In other words, signaling related to differences between the main refresh counter 360 and the secondary refresh counter 370 may not be immediate. In other examples, signaling may be immediate, such as signaling that is initiated as soon as a difference between the main refresh counter 360 and the secondary refresh counter 370 is detected or identified.

In some examples, a rate or initiation criteria for evaluation by the comparator 380 may be configured for various applications, which may include a periodic rate or initiation criteria being set at the comparator 380 itself, or a periodic rate or initiation criteria being set at another component (e.g., of the counter comparison layout 300, of the memory device 110, of the host device 105). For example, comparisons made by the comparator 380 may be initiated by a component external to the comparator 380, or results of a comparison by the comparator 380 may be requested or polled external to the comparator 380.

In some examples, the described techniques for refresh counter verification (e.g., row refresh counter verification) may be enabled based on a value of the mode registers 330, which may be a value set during the manufacture of the memory device 110, a value configured prior to installing the memory device 110 with a host device 105, or a value configured by or using a host device 105. In one example, such functionality may be enabled by setting a mode register (e.g., MRx3[OP6]) to a value of 1. A host device 105 may poll a memory device 110 for such a mode register indication, and perform operations (e.g., refresh operations, evaluation operations, recovery operations) based at least in part on whether or not the value indicates that the memory device 110 is enabled to perform refresh counter verification.

A host device 105 may use signaling from a memory device 110 regarding refresh counter verification in various ways. For example, a host device 105 that receives an indication of a difference between refresh counters from a memory device 110 may determine an operating state of the memory device 110 (e.g., that the memory device 110 is operating in a safe state or evaluation state) and then implement one or more actions or operations. In some examples, the host device 105 may determine to access a different memory device 110 when such signaling is received, and the host device 105 may or may not return to accessing the memory device 110 when such signaling is absent (e.g., after the initial signaling of a difference in refresh counters). In some examples, the host device 105 may evaluate a duration over which such signaling is present and, after a threshold duration has passed, the host device 105 may identify an error state of the memory device 110 (e.g., that the memory device 110 has a persistent error, that the memory device 110 has failed). In such conditions, the host device 105 may transmit an error indication (e.g., to a user, to a system that includes the host device 105), which may include a warning indication, an error display, an indication that the host device 105 or memory device 110 is operating in a degraded manner, an indication that the memory device 110 should be replaced, or others.

Figure 4:
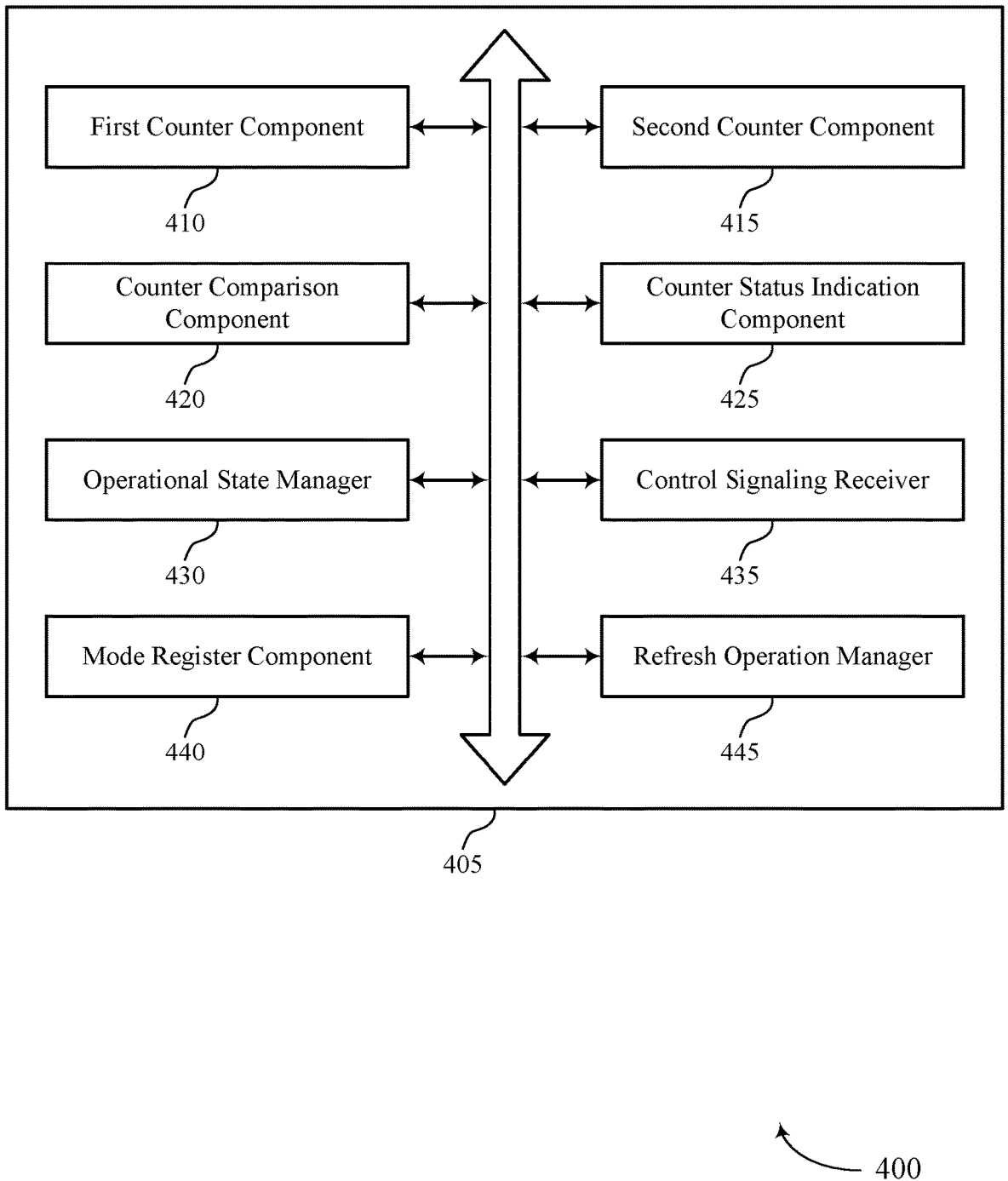
FIG. 4 shows a block diagram of a memory device that supports refresh counters in a memory system in accordance with examples as disclosed herein.

FIG. 4 shows a block diagram 400 of a memory device 405 that supports refresh counters in a memory system in accordance with examples as disclosed herein. The memory device 405 may be an example of aspects of a memory device as described with reference to FIGS. 1 through 3. The memory device 405 may include a first counter component 410, a second counter component 415, a counter comparison component 420, a counter status indication component 425, an operational state manager 430, a control signaling receiver 435, a mode register component 440, and a refresh operation manager 445. Each of these modules may communicate, directly or indirectly, with one another (e.g., via one or more buses).

The first counter component 410 may determine, at a first counter, a first count based on refresh operations performed on a memory array of a memory device.

The second counter component 415 may determine, at a second counter, a second count based on the refresh operations performed on the memory array of the memory device.

The counter comparison component 420 may compare, at the memory device, the first count to the second count.

In some examples, the counter comparison component 420 may determine, based on the comparing, that the first count based on the refresh operations and the second count based on the refresh operations are different. In some examples, the counter comparison component 420 may determine that a difference between the first count and the second count satisfies a threshold, where transmitting the indication to the host device is based on determining that the difference between the first count and the second count satisfies the threshold. In some examples, the counter comparison component 420 may compare the first count to the second count according to a periodic duration.

The counter status indication component 425 may transmit an indication to a host device based on determining that the first count and the second count are different. In some examples, the counter status indication component 425 may transmit the indication to the host device in a data burst. In some examples, the counter status indication component 425 may transmit the indication to the host device in a sideband transmission.

In some cases, transmitting the indication may be based on determining that a difference between the first count and the second count satisfies a threshold. In some cases, the indication may be configured to indicate to the host device that the memory device has modified an operational state to a safe state. In some cases, transmitting the indication may be based on a value of a field of a mode register.

The operational state manager 430 may modify an operational state of the memory device based on determining that the first count based on the refresh operations and the second count based on the refresh operations are different.

The control signaling receiver 435 may receive a signal from the host device, and comparing the first count to the second count may be initiated based on receiving the signal from the host device.

The mode register component 440 may set a field of a mode register to a value based on determining that the first count and the second count are different.

The refresh operation manager 445 may perform refresh operations at the memory device on volatile memory cells of the memory array.

Figure 5:
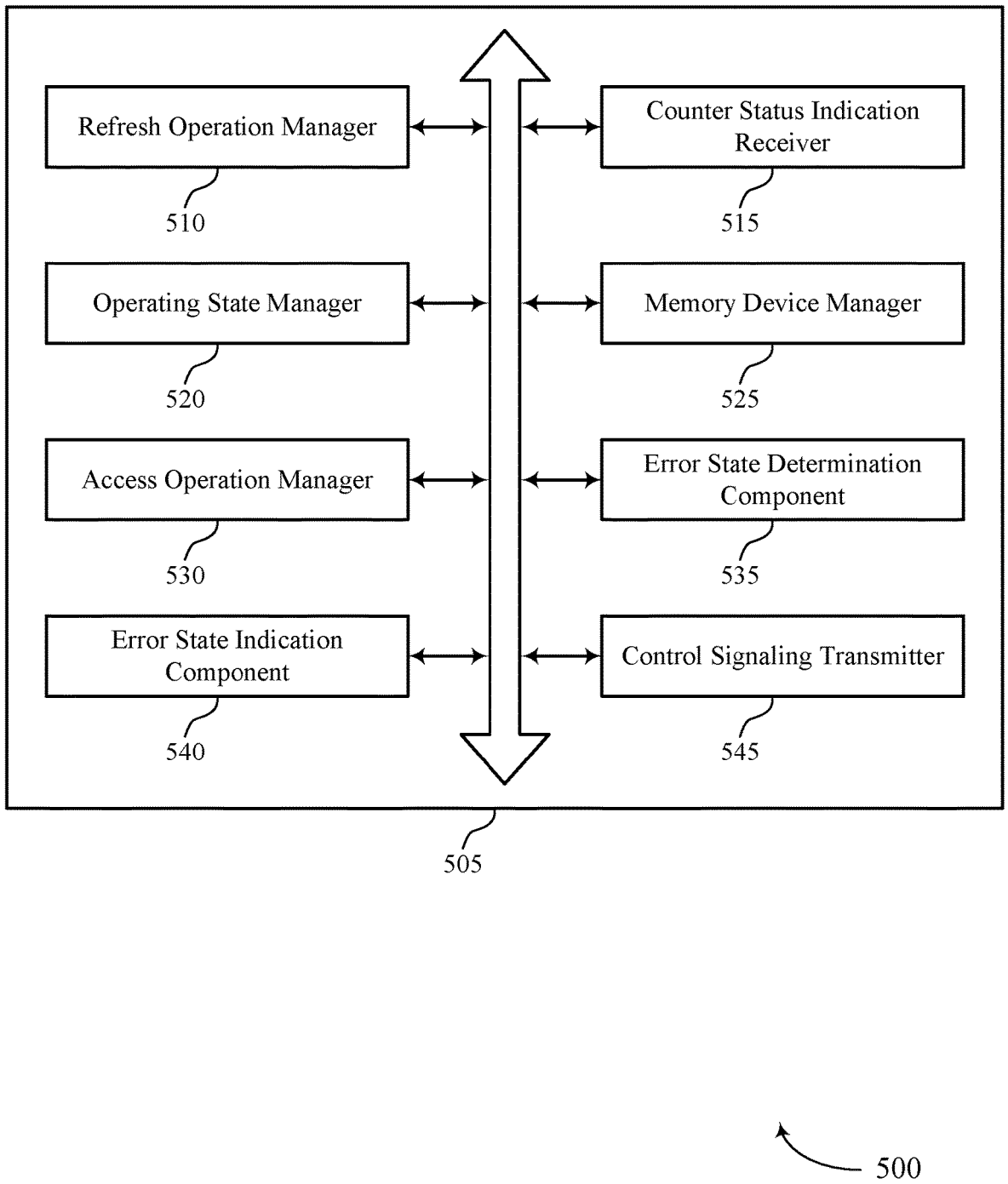
FIG. 5 shows a block diagram of a host device that supports refresh counters in a memory system in accordance with examples as disclosed herein.

FIG. 5 shows a block diagram 500 of a host device 505 that supports refresh counters in a memory system in accordance with examples as disclosed herein. The host device 505 may be an example of aspects of a host device as described with reference to FIGS. 1 through 3. The host device 505 may include a refresh operation manager 510, a counter status indication receiver 515, an operating state manager 520, a memory device manager 525, an access operation manager 530, an error state determination component 535, an error state indication component 540, and a control signaling transmitter 545. Each of these modules may communicate, directly or indirectly, with one another (e.g., via one or more buses).

The refresh operation manager 510 may transmit, to a memory device, commands for performing refresh operations on a memory array of the memory device.

The counter status indication receiver 515 may receive, at a host device, an indication from the memory device that a first count of a first refresh counter of the memory device and a second count of a second refresh counter of the memory device are different.

The operating state manager 520 may determine, at the host device, an operating state of the memory device based on receiving the indication.

In some examples, the operating state manager 520 may determine that a duration associated with the operating state of the memory device satisfies a threshold.

The memory device manager 525 may determine to access a second memory device based on determining the operating state of the memory device.

The access operation manager 530 may perform access operations on the second memory device based on determining to access a second memory device.

The error state determination component 535 may determine an error state of the memory device based on determining that the duration associated with the operating state of the memory device satisfies the threshold.

The error state indication component 540 may transmit an error indication based on the error state of the memory device.

The control signaling transmitter 545 may transmit an indication (e.g., a second indication) to the memory device, where receiving the indication from the memory device is based on (e.g., responsive to) transmitting the indication.

Figure 6:
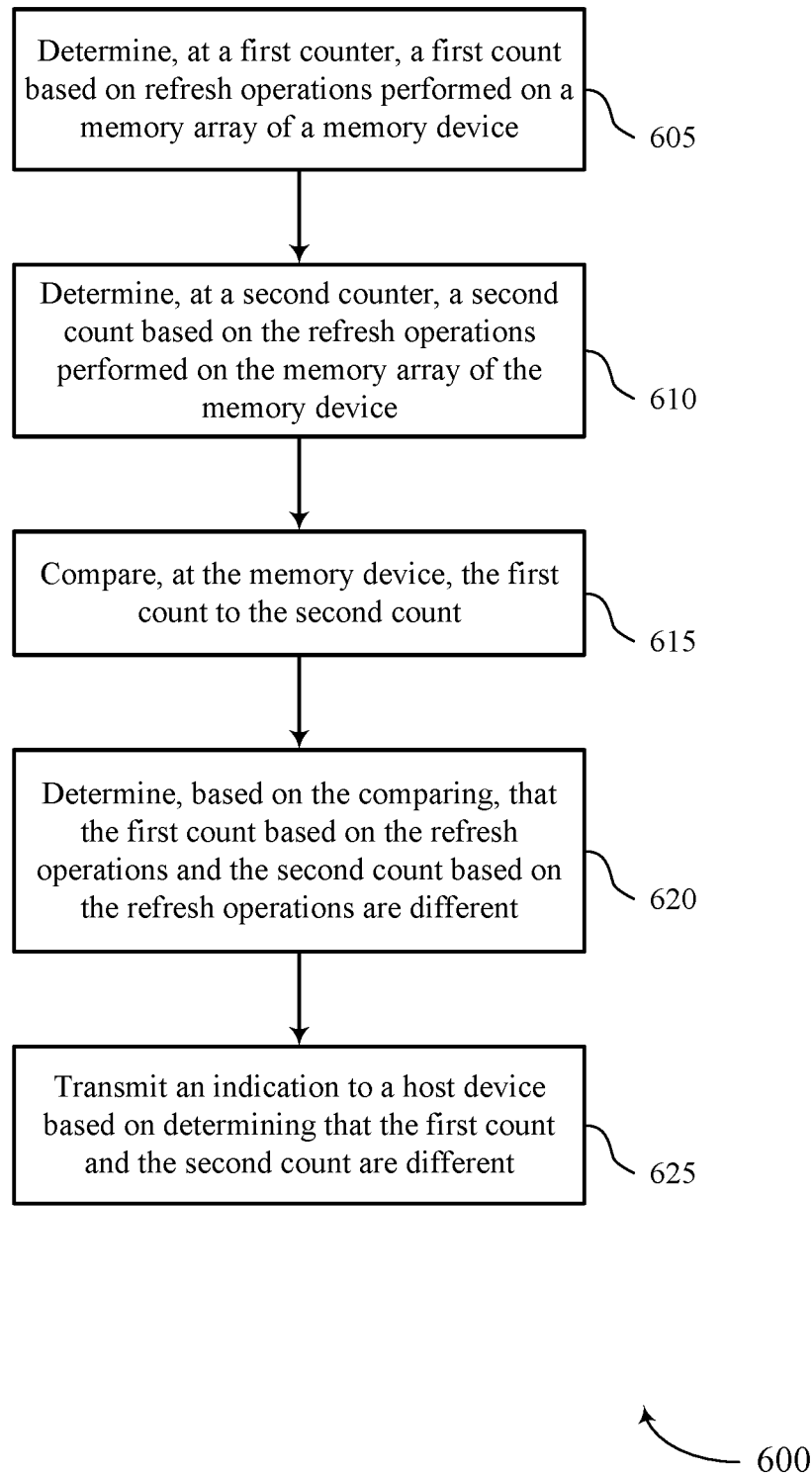
FIGS. 6 through 8 show flowcharts illustrating a method or methods that support refresh counters in a memory system in accordance with examples as disclosed herein.

FIG. 6 shows a flowchart illustrating a method or methods 600 that supports refresh counters in a memory system in accordance with examples as disclosed herein. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, the memory device may determine, at a first counter, a first count based on refresh operations performed on a memory array of a memory device. The operations of 605 may be performed according to the methods described herein. In some examples, aspects of the operations of 605 may be performed by a first counter component as described with reference to FIG. 4.

At 610, the memory device may determine, at a second counter, a second count based on the refresh operations performed on the memory array of the memory device. The operations of 610 may be performed according to the methods described herein. In some examples, aspects of the operations of 610 may be performed by a second counter component as described with reference to FIG. 4.

At 615, the memory device may compare the first count to the second count. The operations of 615 may be performed according to the methods described herein. In some examples, aspects of the operations of 615 may be performed by a counter comparison component as described with reference to FIG. 4.

At 620, the memory device may determine, based on the comparing, that the first count based on the refresh operations and the second count based on the refresh operations are different. The operations of 620 may be performed according to the methods described herein. In some examples, aspects of the operations of 620 may be performed by a counter comparison component as described with reference to FIG. 4.

At 625, the memory device may transmit an indication to a host device based on determining that the first count and the second count are different. The operations of 625 may be performed according to the methods described herein. In some examples, aspects of the operations of 625 may be performed by a counter status indication component as described with reference to FIG. 4.

In some examples, an apparatus as described herein may perform a method or methods, such as the method 600. The apparatus may include features, circuitry, means, or instructions (e.g., a non-transitory computer-readable medium storing instructions executable by a processor) for determining, at a first counter, a first count based on refresh operations performed on a memory array of a memory device, determining, at a second counter, a second count based on the refresh operations performed on the memory array of the memory device, comparing, the first count to the second count, determining, based on the comparing, that the first count based on the refresh operations and the second count based on the refresh operations are different, and transmitting an indication to a host device based on determining that the first count and the second count are different.

Some examples of the method 600 and the apparatus described herein may further include operations, features, circuitry, means, or instructions for modifying an operational state of the memory device based on determining that the first count based on the refresh operations and the second count based on the refresh operations are different.

In some examples of the method 600 and the apparatus described herein, the indication may be configured to indicate to the host device that the memory device may have modified the operational state to a safe state.

Some examples of the method 600 and the apparatus described herein may further include operations, features, circuitry, means, or instructions for determining that a difference between the first count and the second count satisfies a threshold, and transmitting the indication to the host device may be based on determining that the difference between the first count and the second count satisfies the threshold.

In some examples of the method 600 and the apparatus described herein, comparing the first count to the second count may include operations, features, circuitry, means, or instructions for comparing the first count to the second count according to a periodic duration.

Some examples of the method 600 and the apparatus described herein may further include operations, features, circuitry, means, or instructions for receiving a signal from the host device, and comparing the first count to the second count may be initiated based on receiving the signal from the host device.

Some examples of the method 600 and the apparatus described herein may further include operations, features, circuitry, means, or instructions for setting a field of a mode register to a value based on determining that the first count and the second count are different. In some examples, transmitting the indication may include transmitting an indication that is based on the value of the field of the mode register to the host device.

In some examples of the method 600 and the apparatus described herein, transmitting the indication may include operations, features, circuitry, means, or instructions for transmitting the indication to the host device in a data burst.

In some examples of the method 600 and the apparatus described herein, transmitting the indication may include operations, features, circuitry, means, or instructions for transmitting the indication to the host device in a sideband transmission.

Some examples of the method 600 and the apparatus described herein may further include operations, features, circuitry, means, or instructions for performing the refresh operations at the memory device on volatile memory cells of the memory array.

Figure 7:
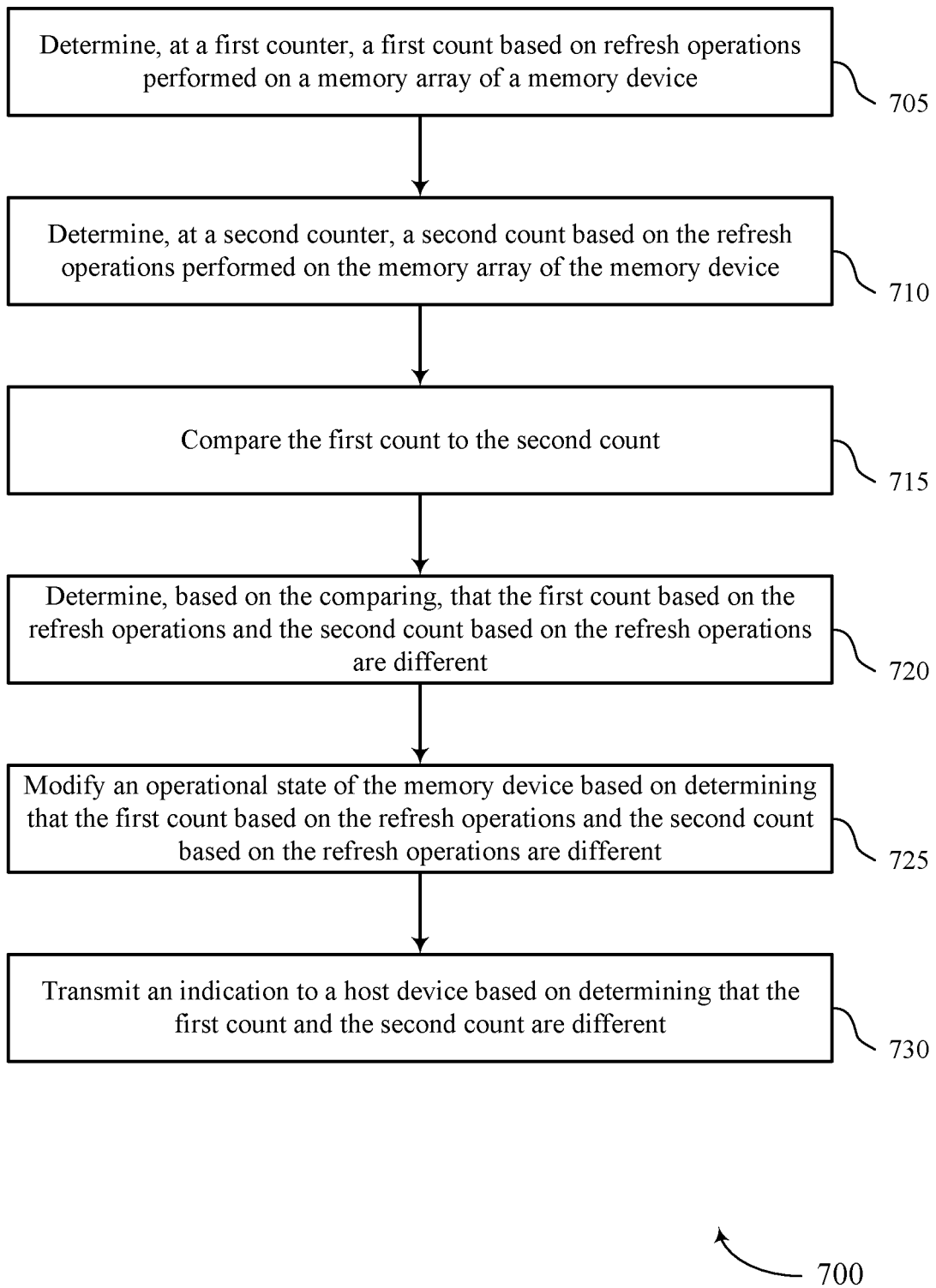

FIG. 7 shows a flowchart illustrating a method or methods 700 that supports refresh counters in a memory system in accordance with examples as disclosed herein. The operations of method 700 may be implemented by a memory device or its components as described herein. For example, the operations of method 700 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 705, the memory device may determine, at a first counter, a first count based on refresh operations performed on a memory array of a memory device. The operations of 705 may be performed according to the methods described herein. In some examples, aspects of the operations of 705 may be performed by a first counter component as described with reference to FIG. 4.

At 710, the memory device may determine, at a second counter, a second count based on the refresh operations performed on the memory array of the memory device. The operations of 710 may be performed according to the methods described herein. In some examples, aspects of the operations of 710 may be performed by a second counter component as described with reference to FIG. 4.

At 715, the memory device may compare the first count to the second count. The operations of 715 may be performed according to the methods described herein. In some examples, aspects of the operations of 715 may be performed by a counter comparison component as described with reference to FIG. 4.

At 720, the memory device may determine, based on the comparing, that the first count based on the refresh operations and the second count based on the refresh operations are different. The operations of 720 may be performed according to the methods described herein. In some examples, aspects of the operations of 720 may be performed by a counter comparison component as described with reference to FIG. 4.

At 725, the memory device may modify an operational state of the memory device based on determining that the first count based on the refresh operations and the second count based on the refresh operations are different. The operations of 725 may be performed according to the methods described herein. In some examples, aspects of the operations of 725 may be performed by an operational state manager as described with reference to FIG. 4.

At 730, the memory device may transmit an indication to a host device based on determining that the first count and the second count are different. The operations of 730 may be performed according to the methods described herein. In some examples, the indication may be configured to indicate to the host device that the memory device has modified the operational state to a safe state. In some examples, aspects of the operations of 730 may be performed by a counter status indication component as described with reference to FIG. 4.

Figure 8:
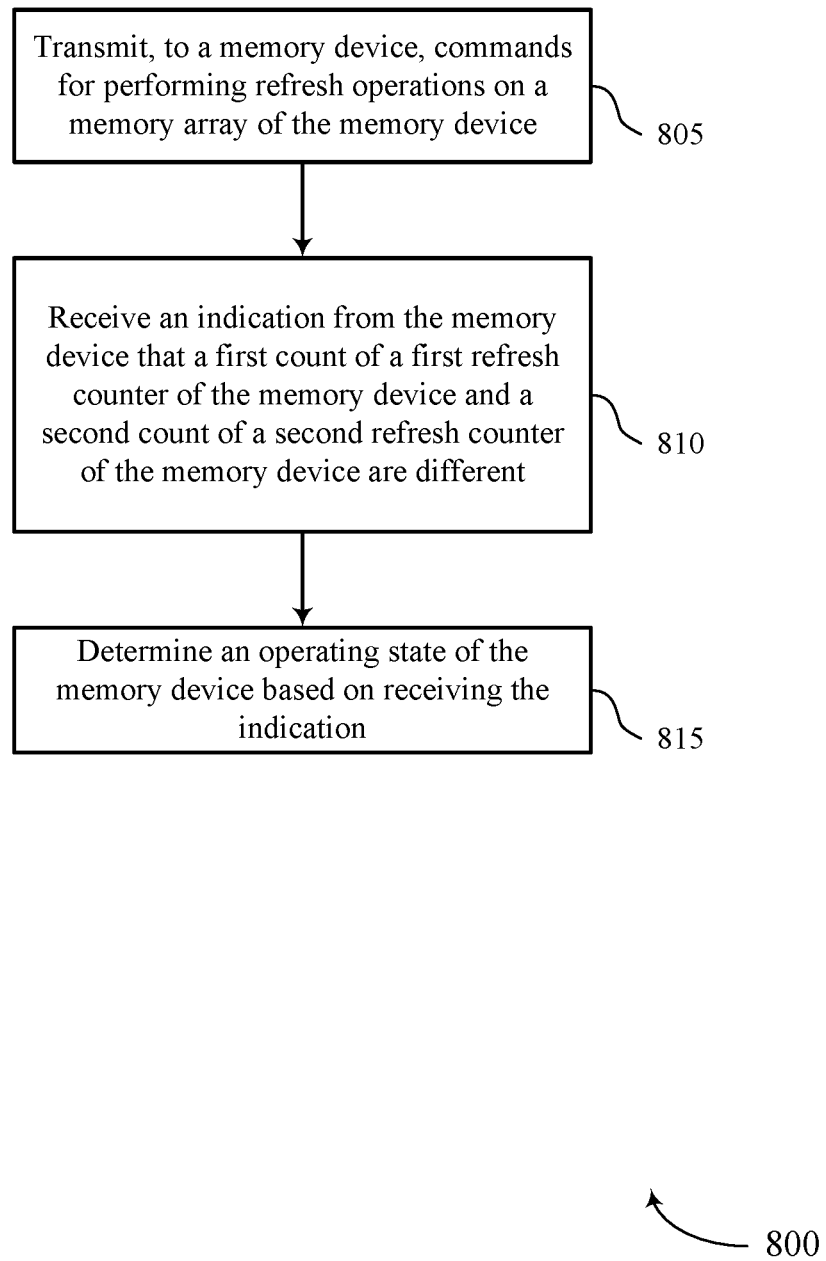

FIG. 8 shows a flowchart illustrating a method or methods 800 that supports refresh counters in a memory system in accordance with examples as disclosed herein. The operations of method 800 may be implemented by a host device or its components as described herein. For example, the operations of method 800 may be performed by a host device as described with reference to FIG. 5. In some examples, a host device may execute a set of instructions to control the functional elements of the host device to perform the described functions. Additionally or alternatively, a host device may perform aspects of the described functions using special-purpose hardware.

At 805, the host device may transmit, to a memory device, commands for performing refresh operations on a memory array of the memory device. The operations of 805 may be performed according to the methods described herein. In some examples, aspects of the operations of 805 may be performed by a refresh operation manager as described with reference to FIG. 5.

At 810, the host device may receive an indication from the memory device that a first count of a first refresh counter of the memory device and a second count of a second refresh counter of the memory device are different. The operations of 810 may be performed according to the methods described herein. In some examples, aspects of the operations of 810 may be performed by a counter status indication receiver as described with reference to FIG. 5.

At 815, the host device may determine an operating state of the memory device based on receiving the indication. The operations of 815 may be performed according to the methods described herein. In some examples, aspects of the operations of 815 may be performed by an operating state manager as described with reference to FIG. 5.

In some examples, an apparatus as described herein may perform a method or methods, such as the method 800. The apparatus may include features, circuitry, means, or instructions (e.g., a non-transitory computer-readable medium storing instructions executable by a processor) for transmitting, to a memory device, commands for performing refresh operations on a memory array of the memory device, receiving an indication from the memory device that a first count of a first refresh counter of the memory device and a second count of a second refresh counter of the memory device are different, and determining an operating state of the memory device based on receiving the indication.

Some examples of the method 800 and the apparatus described herein may further include operations, features, circuitry, means, or instructions for determining to access a second memory device based on determining the operating state of the memory device, and performing access operations on the second memory device based on determining to access the second memory device.

Some examples of the method 800 and the apparatus described herein may further include operations, features, circuitry, means, or instructions for determining that a duration associated with the operating state of the memory device satisfies a threshold, determining an error state of the memory device based on determining that the duration associated with the operating state of the memory device satisfies the threshold, and transmitting an error indication based on the error state of the memory device.

Some examples of the method 800 and the apparatus described herein may further include operations, features, circuitry, means, or instructions for transmitting an indication (e.g., a second indication) to the memory device, where receiving the indication from the memory device may be based on (e.g., responsive to) transmitting the indication.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory array, a first counter configured to increment a first count based on refresh operations performed on the memory array, a second counter configured to increment a second count based on the refresh operations performed on the memory array, a comparator configured to determine a difference between the first count and the second count, and a transmitter configured to transmit an indication based on the difference between the first count and the second count.

Some examples of the apparatus may include a state controller configured to modify an operational state of the apparatus based on the difference between the first count and the second count.

In some examples, the indication transmitted by the transmitter may be configured to indicate that the state controller has entered a safe state.

In some examples, the comparator may be configured to determine that the difference between the first count and the second count satisfies a threshold, and the transmitter may be configured to transmit the indication based on the difference between the first count and the second count satisfying the threshold.

In some examples, the comparator may be configured to initiate determining the difference between the first count and the second count according to periodic duration.

Some examples of the apparatus may include a receiver configured to receive a signal from a host device, and the comparator may be configured to determine the difference between the first count and the second count based on the receiver receiving the signal from the host device.

In some examples, the indication transmitted by the transmitter may include a row decoding status of the apparatus.

Some examples of the apparatus may include a mode register configured for storing operational indicators of the apparatus, and the mode register may be configured for setting a value of a field based on determining the difference between the first count and the second count. In some examples, to transmit the indication, the transmitter may be configured for transmitting an indication of the value of the field.

In some examples, the transmitter may be configured to transmit the indication in a data burst.

In some examples, the transmitter may be configured to transmit the indication via one or more signal paths dedicated to status signaling between the apparatus and a host device.

In some examples, the memory array includes a set of volatile memory cells.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving a first count value from a first counter of a memory device, the first count value based at least in part on refresh operations performed on a memory array of the memory device;
receiving a second count value from a second counter of the memory device, the second count value based at least in part on the same refresh operations performed on the same memory array of the same memory device; and
modifying an operational state of the memory device based at least in part on the second count value being different than the first count value.

2. The method of claim 1, further comprising:
transmitting, by the memory device, an indication of the operational state based at least in part on the memory device modifying the operational state.

3. The method of claim 2, further comprising:
setting a field of a mode register of the memory device to a value based at least in part on the second count value being different than the first count value, wherein transmitting the indication comprises:
transmitting the indication based at least in part on the value of the field of the mode register.

4. The method of claim 1, further comprising:
determining a difference between second count value and the first count value, wherein modifying the operational state of the memory device is based at least in part on the difference between the second count value and the first count value satisfying a threshold quantity of counts.

5. The method of claim 1, further comprising:
determining that the second count value is different than the first count value according to a periodic comparison duration.

6. The method of claim 1, further comprising:
receiving a signal at the memory device; and
determining, at the memory device, that the second count value is different than the first count value based at least in part on receiving the signal.

7. The method of claim 1, wherein modifying the operational state of the memory device comprises:
setting the operational state of the memory device to a safe state or an evaluation state.

8. The method of claim 1, wherein modifying the operational state of the memory device comprises:
increasing a rate of performing refresh operations at the memory device.

9. The method of claim 1, further comprising:
determining a duration over which count values from the first counter are different than count values from the second counter, wherein modifying the operational state is based at least in part on the duration satisfying a threshold.

10. An apparatus, comprising:
a memory array;
a first counter configured to increment a first count based at least in part on refresh operations performed on the memory array;
a second counter configured to increment a second count based at least in part on the same refresh operations performed on the memory array; and
a state controller configured to modify an operational state of the apparatus based at least in part on a difference between the first count and the second count.

11. The apparatus of claim 10, further comprising:
a transmitter configured to transmit an indication of the operational state based at least in part on the modification of the operational state.

12. The apparatus of claim 11, further comprising:
a mode register configured for storing a value of a field based at least in part on the difference between the first count and the second count, wherein the transmitter is configured to transmit an indication of the value of the field.

13. The apparatus of claim 10, further comprising:
a comparator configured to compare the difference between the first count and the second count to a threshold, wherein the state controller is configured to modify the operational state based at least in part on the comparison between the difference between the first count and the second count with the threshold.

14. The apparatus of claim 10, further comprising:
a comparator configured to determine the difference between the first count and the second count according to a periodic comparison duration.

15. The apparatus of claim 10, further comprising:
a receiver configured to receive a signal; and
a comparator configured to determine the difference between the first count and the second count based at least in part on the received signal.

16. The apparatus of claim 10, wherein, to modify the operational state of the apparatus, the state controller is configured to:
set the operational state of the apparatus to a safe state or an evaluation state.

17. The apparatus of claim 11, wherein, to modify the operational state of the apparatus, the state controller is configured to:
increasing a rate of performing refresh operations on the memory array.

18. An apparatus, comprising:
a controller operable to couple with a memory device, the controller configured to cause the apparatus to:
transmit commands for the memory device to perform refresh operations on a memory array of the memory device;
receive an indication that a first count of the refresh operations by a first refresh counter of the memory device is different than a second count of the same refresh operations by a second refresh counter of the memory device; and
modify an operating state of the apparatus based at least in part on receiving the indication that the first count of the refresh operations is different than the second count of the same refresh operations.

19. The apparatus of claim 18, wherein, to modify the operating state of the apparatus, the controller is configured to cause the apparatus to:
perform access operations on a second memory device based at least in part on receiving the indication that the first count of the refresh operations is different than the second count of the same refresh operations.

20. The apparatus of claim 18, wherein the controller is further configured to cause the apparatus to:
  transmit an error indication based at least in part on receiving the indication that the first count of the refresh operations is different than the second count of the same refresh operations.

\* \* \* \* \*